Figure 1:
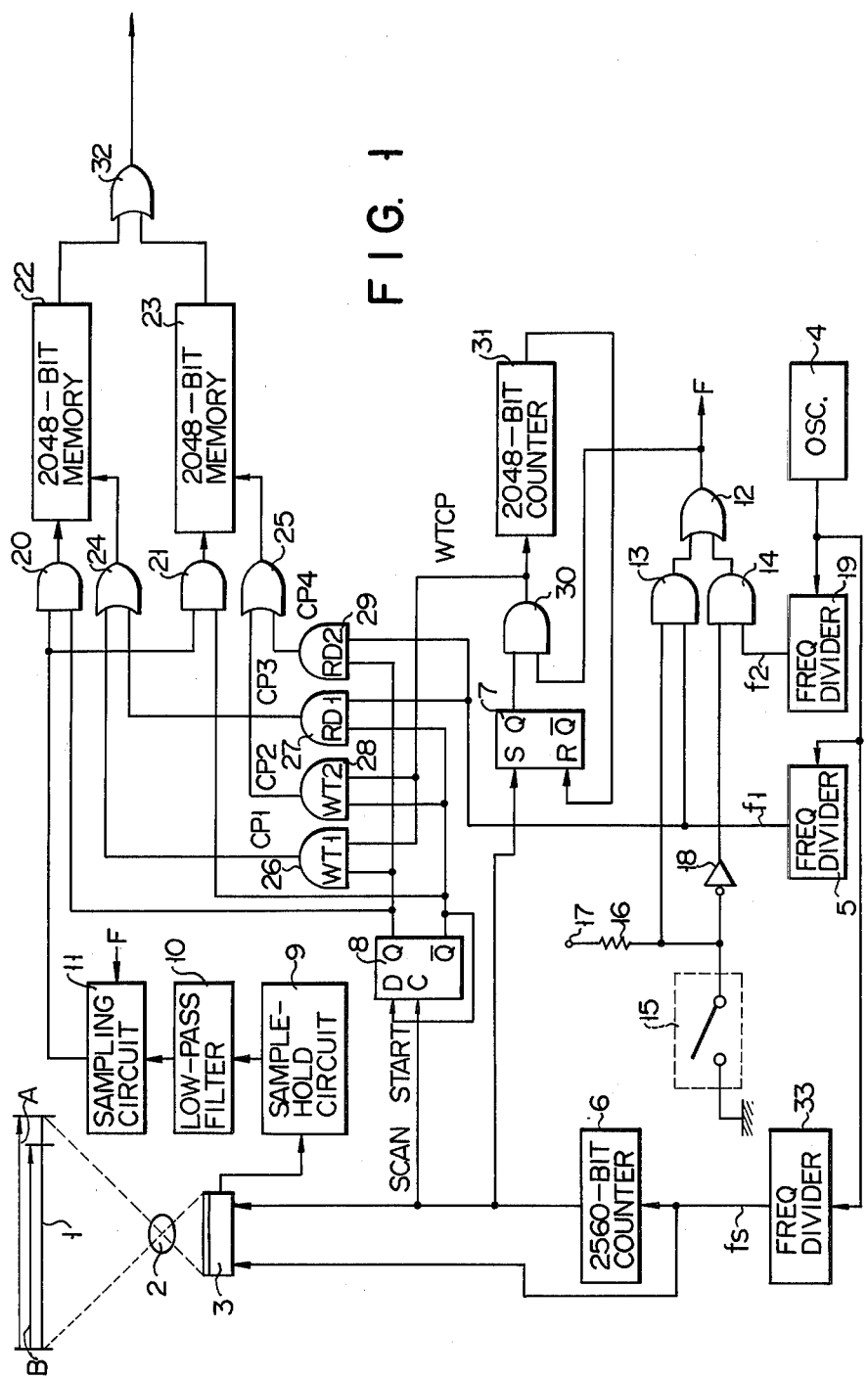

United States Patent [19]
Okano

[11] 4,081,843
[45] Mar. 28, 1978

[54] FACSIMILE TRANSMISSION APPARATUS

[75] Inventor: Michiaki Okano, Kawasaki, Japan

[73] Assignee: Tokyo Shibaura Electric Co., Ltd., Kawasaki, Japan

[21] Appl. No.: 746,200

[22] Filed: Nov. 30, 1976

[30] Foreign Application Priority Data

Dec. 1, 1975   Japan .................................. 50-143624

[51] Int. Cl.² ............................................. H04N 1/02
[52] U.S. Cl. .................................... 358/294; 358/280; 358/288; 358/293; 358/213
[58] Field of Search ............... 358/280, 285, 287, 288, 358/293, 294, 213

[56] References Cited
U.S. PATENT DOCUMENTS

| | | | |
|---|---|---|---|
| 2,824,902 | 2/1958 | Pollard | 358/280 |
| 2,982,815 | 5/1961 | Buckingham | 358/285 |
| 3,272,918 | 9/1966 | Koll | 358/287 |
| 3,541,245 | 11/1970 | Wilby | 358/280 |
| 3,800,080 | 3/1974 | Fuwa | 358/280 |

*Primary Examiner*—Howard W. Britton
*Attorney, Agent, or Firm*—Oblon, Fisher, Spivak, McClelland & Maier

[57] ABSTRACT

A facsimile transmission apparatus comprising a picture signal producing circuit for producing picture signals by scanning a region including the original sheet face of the original sheet of the maximum size in those sheets to be transmitted, circuitry for storing the picture signals produced by the picture signal producing circuit alternately in two memories under the control of clock signals having different frequencies corresponding to the size of the original document and giving a predetermined number of bits for each horizontal scanning line irrespective of the size of the original sheet, and a readout circuit for reading out the picture signals stored in the two memories for transmission at the rate corresponding to the scanning rate in a receiver side.

4 Claims, 3 Drawing Figures

FACSIMILE TRANSMISSION APPARATUS

The present invention relates to a facsimile transmission apparatus and, more particularly, to the one in which, when the width of the original sheet to be transmitted is wider than the effective recording width, it transmits such picture signals providing the picture reproduced at the receiving side in the form of a compression of the original sheet size.

In the facsimile transmission apparatus by telephone lines, for example, the maximum scanning width is generally established in accordance with the size of the original sheet to be transmitted. Generally, ordinary documents are the original sheet commonly used in the fascimile transmission and the specified papers of A and B size by the Japanese Industrial Standards (JIS) are predominently used. For this, the maximum scanning width of the facsimile transmission apparatus also is established coinciding with those specified sizes. With recent prevalances of computers, the original sheet of the size other than specified one must frequently be transmitted. In the line printer of the computer, for example, of the sheet used the lateral length (width) is longer by about 25 mm than that of B4 size specified by JIS. When the line printer sheet is used as the original sheet for transmission, one end of the sheet must be cut off 25 mm to 30 mm in the lateral direction, when it is used in the facsimile transmission apparatus for B4 size. In this case, accordingly, the visual information written or printed on the cut-off portion of the original sheet can not be reproduced at the receiver side. This problem can easily be solved if a set of newly developed facsimile transmission and receiving apparatuses are used. However, demand for such facsimile transmission apparatus is still little. More adversely, since specially treated paper such as electrostatic recording paper is used as the recording paper at the receiving side, this necessitates change of the electrostatic recording paper, being accompanied by change of the recording head. Accordingly, this method by the newly developed facsimile transmission apparatus is problematic and provides no answer to the above-mentioned problem.

Accordingly, an object of the present invention is to provide a facsimile transmission apparatus permitting the picture transmission of the original sheet of which the size is the same as or larger than that of the recording paper at the facsimile receiving side, without any omission of the visual information on the original sheet, and without any change of the facsimile receiver.

According to the present invention, there is provided a facsimile transmission apparatus comprising means for producing picture signals by scanning a region including the original sheet face of the original sheet of the maximum size in those sheet to be transmitted; means for storing the picture signals produced by the means under the control of clock signals having different frequencies corresponding to the size of the original documents and giving a predetermined number of bits for each horizontal scanning line irrespective of the size of the original sheet; and means for reading out the picture signals stored in the storing means for transmission at the rate in synchronism with the scanning rate in the receiver side.

Figure 2:
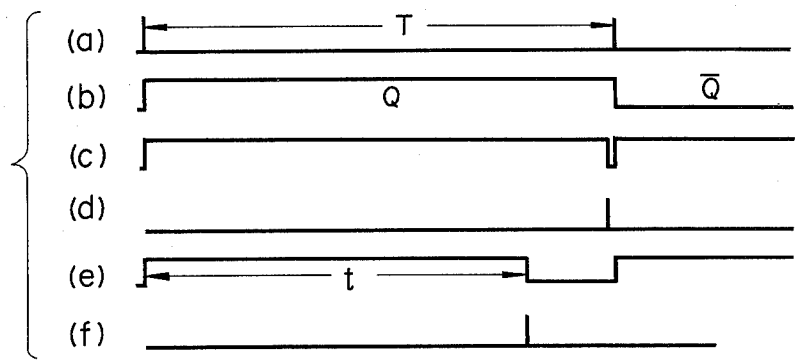
Figure 3:
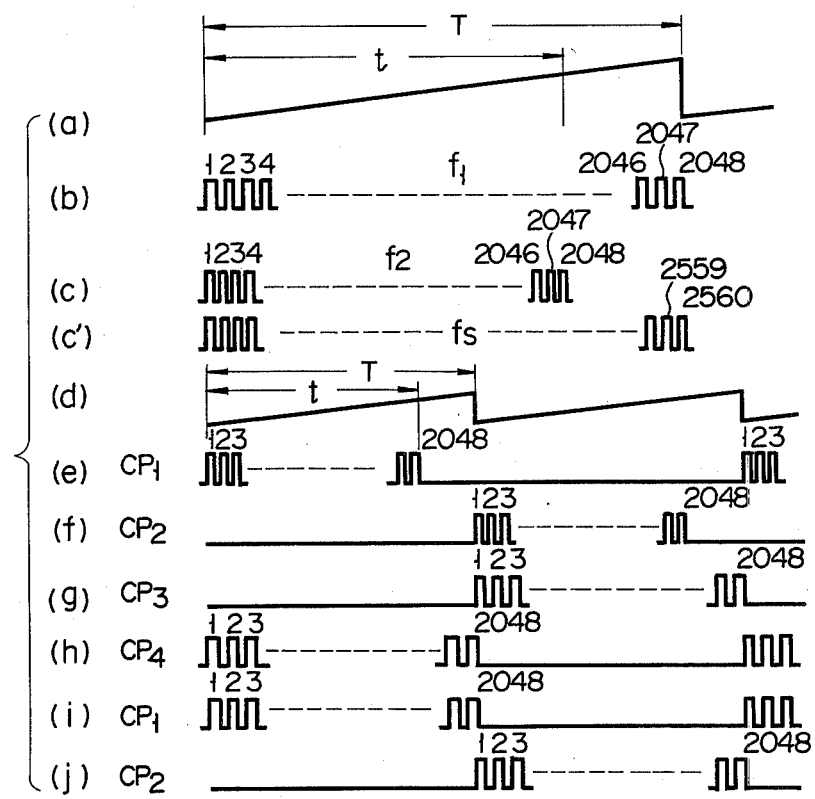

Other objects and features of the present invention will be apparent from the following description taken in connection with the accompanying drawings, in which:

FIG. 1 shows a block diagram of an embodiment of a facsimile transmission apparatus according to the present invention; and FIGS. 2 and 3 show timing diagrams to aid in explaining the operation of the apparatus of FIG. 1.

Reference is now made to FIG. 1 illustrating one form of a facsimile transmission apparatus according to the present invention. In the figure, reference numeral 1 denotes the sheet face of an original sheet containing the visual information such as a picture, printing or writing. The visual information on the sheet face 1 is optically projected onto a solid-state scanning device 3 through a lens 2, to form an image thereon. The solid-state scanning device 3 in this embodiment is comprised of a plurality of photoelectric conversion elements such as photodiodes arranged in the horizontal direction of the original sheet. More particularly, it is constructed by five solid-state line scanners connected in series fashion, the line scanner being made by RETICON CORPORATION in U.S.A. and sold bearing the number of RL-512c. The RL-512c line scanner includes 512 photoelectric conversion elements and thus if five line scanners are connected in series, $512 \times 5 = 2560$, i.e. 2560 photoelectric conversion elements are arranged in a line directed in the horizontal scanning direction of the original sheet. That is, the solid-state scanning device 3 is comprised of 2560 photoelectric conversion elements arranged in such a way. The solid-state scanning device 3 acts to successively switch 2560 photoelectric conversion elements thereby to electronically scan the original sheet face 1 in the horizontal direction. Through this scanning operation, the picture, for example, on the original sheet face 1 is successively transformed into electric signals which are in turn outputted as picture signals. The scanning in the longitudinal or vertical direction of the original sheet face 1 is carried out in a manner that the relative position of original sheet face 1 to the solid-state scanning device 3 is shifted every time one horizontal scanning is completed. The shifting operation is made by stepwisely shifting the original sheet through the drive of a pulse motor (not shown).

The maximum horizontal scanning width A of the solid-state scanning device 3 is set to 280 mm in this embodiment. This dimension of the width is larger than the lateral width 254 mm of B4 size of sheet (254 mm in width $\times$ 364 mm in length) by the Japanese Industrial Standards (JIS), but is substantially equal to the width of the line printer sheet.

2560 Photoelectric elements in the solid-state scanning device 3 is successively scanned by applying to the scanning pulse input terminal of the apparatus 3 the pulse signals $fs$ having 2560 pulses during the time T as shown in FIG. 3($c'$). The signals $fs$ are produced by frequency-dividing the output signal from a pulse generator 4 in a frequency divider 33. More precisely, 2560 photoelectric elements in the solid-state scanning device 3 are successively switched from right to left as viewed in the drawing so that the sheet face 1 is scanned over its maximum scanning width A from left to right, resulting in outputting a series of 2560 bits of picture signals. When one scanning operation is completed in the solid-state scanning device 3, a 2560-bit counter 6 produces a carry signal which in turn is applied to the scanning starting terminal of the solid-state scanning device 3 to begin the scanning of the next scanning line. The carry signal from the counter 6 is also applied to the set terminal of the flip-flop 7 for controlling the writing operation into a memory and to the clock terminal of a flip-flop 8 for changing the input/output mode of the memory, thereby to set the flip-flop 7 and to change the flip-flop 8 to the opposite state.

A series of the picture signals of 2560 bits obtained through one scanning operation of the solid-state scanning device 3 are fed to a sample-hold circuit 9 where those signals are converted into an analogue signal which is then delivered to a low-pass filter 10 where the analogue signal is smoothed in the wave shape. The cut-off frequency of the low-pass filter 10 is selected to be, for example, the frequency of the pulse signal $fs$. The output signal from the low-pass filter 10 is applied to a sampling circuit 11 where it is again converted to digital picture signals. A sampling pulse to be applied to the sampling circuit 11 is fed from an OR circuit 22. Two input terminals of the OR circuit 12 are connected to the outputs of AND circuits 13 and 14, respectively. One of the input terminals of the AND circuit 13 receives the pulse signal $f1$ from the frequency divider 5, while the other input terminal of the AND circuit 13 receives the output of a switch 15 for changing the original paper sheet width. The switch 15 is grounded at one terminal while at the other terminal connected to the input of the AND circuit 13 and also to a high voltage terminal 17 through a resistor 16. The switch 15 is also connected to one of input terminals of an AND circuit 14 through an inverter 18, and the other input terminal of the AND circuit 14 is connected to the output of a frequency divider 19. The frequency divider 19 divides the frequency of the output pulse signal of the pulse generator 4 to produce a pulse train with 2048 repetition frequency $f2$, as shown in FIG. 3(c).

The analogue picture signal transferred to the input of the sampling circuit 11 is sampled by the sampling signal F (the pulse signal $f1$ or $f2$) from the OR circuit 12, thereby to be converted to picture signals of 2048 bits. The digital picture signals converted are then transferred to one of the input terminals of each AND circuit 20 and 21. The $\overline{Q}$ output of the flip-flop 8 is coupled with the other input of the AND circuit 20. The Q output of the same flip-flop 8 is applied to the other input of the AND circuit 21. With this circuit connection, the picture signal from the sampling circuit 11 is loaded into a 2048 bit memory 22 through the AND circuit 20 when the Q output of the flipflop 8 is in the "1" condition, but, when the $\overline{Q}$ output of the flip-flop 8 is "1," the picture signal is loaded into a 2048 bit memory 23 through the AND circuit 21.

The outputs of OR circuits 24 and 25 are connected to the memories 22 and 23, respectively, for clock pulses supply. The OR circuit 24 is connected at its inputs to the outputs of AND circuits 26 and 27. The OR circuit 25 is connected at the two inputs to the outputs of AND circuits 28 and 29. One of two inputs of each AND circuit 26 and 29 is connected to the Q output terminal of the flipflop 8. One of two inputs of each AND gate 27 and 28 is connected to the $\overline{Q}$ output terminal of the flip-flop 8. The other input terminal of each AND circuit 26 and 28 is connected to the output of an AND circuit 30. One of inputs of the AND circuit 30 is connected to the Q output terminal of the flip-flop 7, while the other input is connected to the output of an OR circuit 12. The output of the AND circuit 30 also is connected to a 2048 bit counter 31 whose output is further connected to the reset input R of the flip-flop 7 for controlling the loading to the memory. The other inputs of the AND circuits 27 and 29 are coupled to the output of the frequency divider 5 for receipt of the pulse signal $f1$.

The outputs of two 2048-bit memories 22 and 23 are connected to an OR circuit 32 connected further to a telephone line (not shown). The picture signal from the OR circuit 32 is transmitted to the specified facsimile receiver (not shown) through the telephone line.

The description to follow referring to FIGS. 2 and 3 is the operation in detail of the facsimile transmitting apparatus mentioned above in construction referring to FIG. 1. The first case to be described is a case where an original sheet with the maximum width A is placed on the original sheet setting position. The photoelectric conversion elements of 2560 of the solid-state scanning device 3 are successively scanned by the pulse signal fs shown in FIG. 3(c') fed from the frequency divider 33. Through this scanning of the elements, the original sheet with the width A is scanned from one side to the other side in the horizontal direction, with the result that the picture signals of 2560 bits are successively fed to the sample-hold circuit 9. When one horizontal scanning operation is completed, the carry signal with the period T shown in FIG. 2(a) from the 2560-bit counter 6 is delivered to the solid state scanning device 3 to begin the next line scanning and to set and change the flip-flops 7 and 8, respectively. The picture signal fed to the sample-hold circuit 9 is converted to an analogue signal which in turn is wave-shaped in the low-pass filter 10 and then is converted again to the original digital form of signal in the sampling circuit 11. For sampling pulses to the sampling circuit 11, the pulse signals $f1$ from the frequency divider 5 is used to reach the sampling circuit 11 after passing through the AND circuit 13 and the OR circuit 12. At this time, the AND circuit 13 is enabled by a high voltage fed through the resistor 16 from the terminal 17 when the original sheet width changing switch 15 is opened. As shown in FIG. 2 and FIGS. 2(a) and (b), 2048 sampling pulses during the time T necessary for horizontal scanning one time across the original sheet with the maximum width A are fed to the sampling circuit 11. The picture signal from the sampling circuit 11 is applied to the input of the memory 22 through the AND circuit 20 enabled by the Q output of the flip-flop 8. At this time, the AND circuit 26 is conditioned by the same Q output of the flip-flop 8. Further, the flip-flop 7 for exchanging the input and output modes of the memory is set and produces Q output which appears at one input of the AND gate 30. The AND gate 30 also has at the other input the pulse signals F from the OR gate 12 as mentioned above. Thus the AND gate 30 is enabled to feed the output to the other input of the AND gate 26. Therefore, the AND gate 26 is enabled to feed its output CP1 (FIG. 3(i)) to the memory 22 through the OR circuit 24. Upon receipt of the clock pulses CP1, the memory 22 permits the output of the sampling circuit 11 to be loaded into the memory 22 per se.

The AND circuit 21 remains disabled since the flip-flop 8 does not produce the $\overline{Q}$ output so that the output of the sampling circuit 11 is not applied to the memory 23. At this time, the AND circuit 29 permits pulse signals CP4 as shown in FIG. 3(g) from the frequency divider 5 to pass therethrough to the input/output control terminal of the memory 23 through the OR circuit 25. In response to the clock pulses CP3, the contents of the memory 23 is read out through the OR circuit 32. Incidentally, the frequency of the read-out clock pulses CP4 is set in synchronism with the scanning rate in the receiver side. The output pulses CP1 from the AND circuit 30 to reach in number 2048 and at this time the 2048 bit counter 31 produces a carry signal (FIG. 2(d)) by which the flip-flop 7 is reset (FIG. 2(c)). As a result, the AND circuit 30 is disabled, and the writing and the reading operations of the memories 22 and 23 are completed.

The 2560-bit counter 6 counts 2560 of the pulse signals $fs$ to produce a carry signal (FIG. 2(a)) which in turn is applied to a pulse motor (not shown). The pulse motor is not shown here since this is not essential to the present invention and no description thereof does not provide any inconvenience in explaining the present invention. Upon receipt of the carry signal, the pulse motor is driven to shift the original sheet 1 in the vertical direction by one horizontal scanning line. Following the shift operation, the horizontal scanning to the solid-state scanning device 3 commences again. At this time, the carry signal from the counter 6 sets the flip-flop 7 (FIG. 2(c)) and changes the flip-flop 8 to produce the output at the $\overline{Q}$ output (FIG. 2(b)).

The original sheet on the original sheet setting position is scanned over the maximum width A thereof by the solid-state scanning device 3, with the result that the picture signals of 2048 bits are produced from the sampling circuit 11, as in the previous manner. In this scanning operation, since the output from the flip-flop 8 appears at the Q output, the AND circuits 20, 26 and 29 are disabled while the AND circuits 21, 27 and 28 are enabled. Accordingly, the output from the sampling circuit 11 is stored into the memory 23 in response to the clock pulses CP2 shown in FIG. 3(f), and the picture signals by the previous scanning stored in the memory 22 are read out through the OR circuit 32, in response to clock pulses CP3 (FIG. 3(g)). The counter 31 counts 2048 pulses of the pulse signals $f1$ to produce a carry signal (FIG. 2(d)) which then resets the flip-flop 7. In this manner, the horizontal scanning repeatably progresses from the top to the bottom of the original sheet.

It will be understood, accordingly, that if the picture signals thus obtained is scanned at the receiver sides at a rate of time T per line, the picture on the original sheet of the line printer sheet is reproduced on the sheet of B4 size with a picture including 2048 bits a scanning line.

Description will be given of the case where the original sheet is of the specified size, e.g. B4 size. In this case, the original sheet size changing switch 15 is closed. As a result, the connection point between the input of the AND gate 13 and the resistor 16, and the input of the inverter 18 as well are grounded and thus the inverter input is LOW and the AND gate 13 is disabled, but the AND circuit 14 is enabled. Accordingly, the OR circuit 12 permits the pulse signals f2 from the frequency divider 19 to pass therethrough to the AND circuit 30 and to the sampling circuit 11. The pulse signals $f2$ (FIG. 3(c)) have such a frequency that the number of pulses during time $t$ necessary for scanning the B4 size original sheet with the width B by the pulse signals $fs$ (FIG. 3(c')), is 2048 pulses.

The scanning of the original sheet face 1 by the pulse signals fs is made over the entire width A of the maximum, even if the original sheet to be scanned has the width of B. Therefore, the solid-state scanning device 3 feeds the picture signals of 2560 bits to the sample-hold circuit 9. It is to be noted here that the picture information is included in the outputs of the photoelectric elements arranged corresponding to the range of B starting from the scanning starting point on the original sheet face, but it is not included in the outputs of the photoelectric elements arranged corresponding to the difference "A − B" on the face 1. The picture signal which is converted to the analogue signal in the sample-hold circuit 9 is wave-shaped in the low-pass filter 10 and then is applied to the sampling circuit 11.

The pulse signals f2 are supplied to the sampling input terminal of the sampling circuit 11, and times the sampling of the output of the low-pass filter 10. At this time, the pulse signals $f2$ is outputted from the AND circuit 30 and thus two 2048-bit memories 22 and 23 are operated at the rate determined by the pulse $f2$.

Assume now that the first carry signal of the counter 6 sets the flip-flop 8 so as to produce the Q output "1." As in the previous case, the picture signals from the sampling circuit 11 is loaded into the memory 22 in response to the clock pulses CP1 (FIG. 3(e)). As the writing operations of the memory 22 are completed, the carry signal of the counter 31 (FIG. 2(f)) resets the flipflop 7 (FIG. 2(e)), resulting in the case of the operation of the memory 22. At this time, the output of the sampling circuit 11 corresponds to the scanning completion point of the width B of the original paper and, hence, the picture signals produced by the scanning following that scanning completion point, i.e. those corresponding to the width difference "A − B," are cut away without storing it in the memory 22.

In this way, the scanning of the maximum width A of the original sheet by the solid-state scanning device 3 is finished and, at this time, the counter 6 produces a carry which in turn causes to begin the next scanning of the solid-state scanning device 3 and to set the flip-flop 7, and the $\overline{Q}$ output of the flip-flop 8 becomes "1." Under this circuit condition, the picture signals from the sampling circuit 11 are loaded into the memory 23 in response to clock signals CP2 (FIG. 3(f)), while, at the same time, the contents of the memory 22 are read out by the clock pulses $f1$ to be transmitted to the receiver side through the OR circuit 32, with the picture signals having 2048 bits per one scanning line.

As described above, the pictue signals obtained by scanning a given region including the original sheet face are written into the memory, the picture signals including a predetermined number of bits irrespective of the size of the original sheet, by using the clock pulses having such a frequency corresponding to the size of the original sheet as to give a predetermined number of bits during the scanning period of time for the original sheet face, and, then the such picture signals stored in the memory are read out at a given frequency corresponding to the transmission rate, irrespective of the size of the original sheet. Therefore, the picture signals may be transmitted in an ordinary transmission mode for the original sheet of specified size, while the transmission is made in a contruction mode for the sheet larger than the specified size. The omission of the information which otherwise is needed is eliminated for the visual information transmission. With respect to the receiving side, the conventional receiving set may be used without any modification for it so that the use of recording papers for extra sizes as well as the use of modified receivers is unnecessary.

In the case of the original sheet size larger than the specified one, the horizontal scanning length for the reproduced picture at the receiver side is relatively contracted in comparison with that of the original sheet. For thus, the resolution of the reproduced picture is slightly deteriorated. Such a degree of the resolution deterioration provides little problem in practice use, when the nature of characters need in the original sheet is taken into account. For example, the contents recorded on the line printer paper is readable even if it is physically contracted slightly in the lateral direction.

In the heretofore described embodiment, description was given only about the picture transmission of the B4 size specified sheet and of the sheet larger than that. It will be understood, however, that clock signals with a plurality of frequencies each having the same number of bits, such as 2048 bits, for the respective times $t1$, $t2$ and $t3$ required for scanning various sizes or original documents, for example, B4, A4 and B5 sizes, may be used for executing the writing, and reading of the picture signals for memories may be executed by using clock pulses having a specified frequency. In this case, a single transmission apparatus is available for a plurality of facsimile receiving apparatuses having various effective recording widths, for example, B4, A4 and B5.

While, in the embodiment mentioned above, two one-line memories are used, a number of memories may be used with the sequential operation thereof.

The memory for frequency-band compression frequently used in the facsimile transmission apparatus may be commonly used for the memories of the facsimile transmission apparatus of the present invention.

As a matter of course, the memory having a memory capacity capable of storing more than two scanning lines may be used in place of the one scanning line storing memory.

In the above-mentioned embodiment, 2048 bits was selected for one scanning line of the picture signal, with intentions to easily compress the digital band width and to store the picture signals at a possibly high density in the memory within the storage capacity thereof.

Various other modifications of the disclosed embodiment will become apparent to the person skilled in the art without departing from the spirit and scope of the invention as defined by the appended claims.

What is claimed is:

1. A facsimile transmission apparatus comprising:
   means for producing picture signals by scanning a region including the original sheet face of the original sheet of the maximum size in those sheets to be transmitted;
   means for storing the picture signals produced by said means under the control of clock signals having different frequencies corresponding to the size of the original sheet and giving a predetermined number of bits for each horizontal scanning line to the width of the original sheet; and
   means for reading out the picture signals stored in said storing means for transmission at the rate of synchronism with the scanning rate in the receiver side.

2. A facsimile transmission apparatus comprising:
   means for producing picture signals by scanning a region including the original sheet face of the original sheet of the maximum size in those sheets to be transmitted, said picture signal producing means including a solid-state scanning device having photoelectric conversion elements connected in series fashion with the number corresponding to the width of the maximum size original sheet, clock means for sequentially switch said photoelectric conversion elements for electronically scanning, a sample-hold circuit for converting the output of said solid-state scanning device of the corresponding analogue signal, a low-pass filter for waveshaping the output of said sample-hold circuit, and a sampling circuit for reconstructing said picture signals having a given number of bits from the output of said low-pass filter;
   means for storing the picture signals produced by said means under the control of clock signals having different frequencies corresponding to the size of the original sheet and giving a predetermined number of bits for each horizontal scanning line to the width of the original sheet; and
   means for reading out the picture signals stored in said storing means for transmission at the rate in synchronism with the scanning rate in the receiver side.

3. A facsimile transmission apparatus comprising:
   means for producing picture signals by scanning a region including the original sheet face of the original sheet of the maximum size in those sheets to be transmitted;
   means for storing the picture signals produced by said means under the control of clock signals having different frequencies corresponding to the size of the original sheet and giving a predetermined number of bits for each horizontal scanning line to the width of the original sheet, said storing means including a first and a second memories, means for producing clock signals having frequencies corresponding to the original sheet sizes, and gate means for writing the picture signals alternately into said first and second memory means every one horizontal scanning under the control of one of said clock signals; and
   means for reading out the picture signals stored in said storing means for transmission at the rate in synchronism with the scanning rate in the receiver side, the read-out means including gate means for reading out the picture signals alternately said second and first memories every one horizontal scanning under the control of the other clock signal.

4. A facsimile transmission apparatus according to claim 3, said clock signal producing means comprises: an oscillator; a first and a second frequency dividers for dividing the frequency of the output of said oscillator; a switch for switching the size of original sheet; and a first and a second AND circuits being controlled by the switching operation of said switch.

* * * * *